Patented Oct. 23, 1951

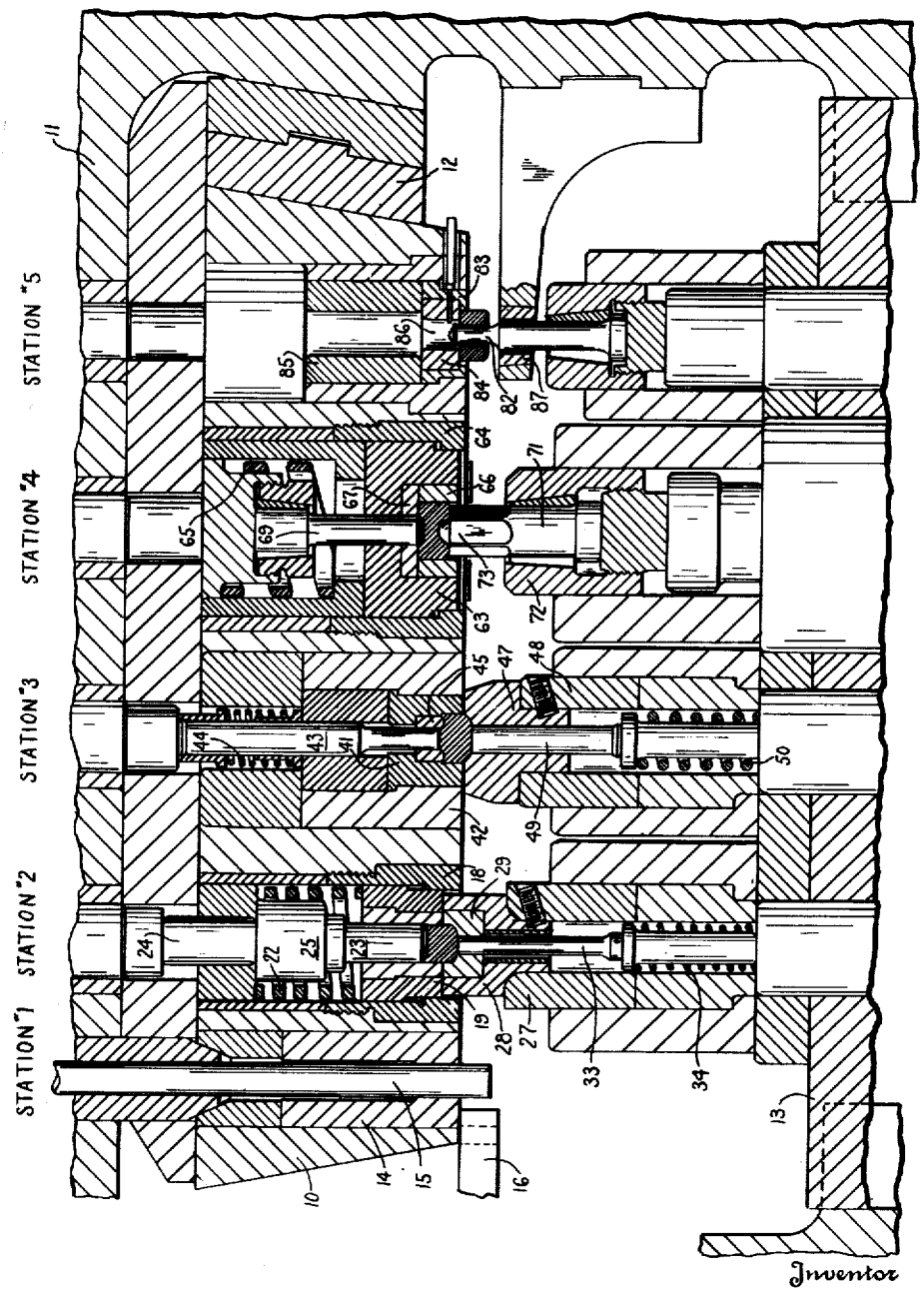

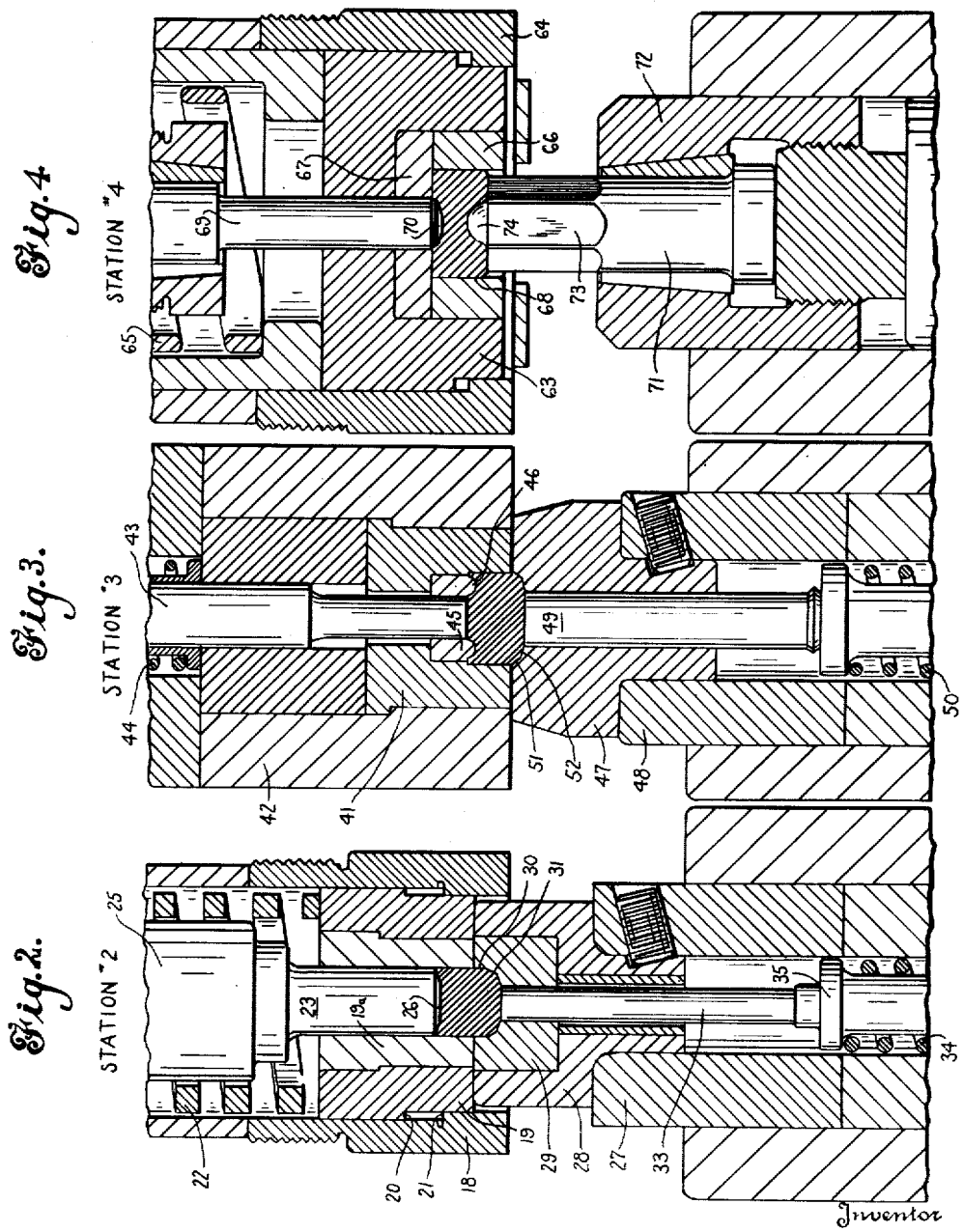

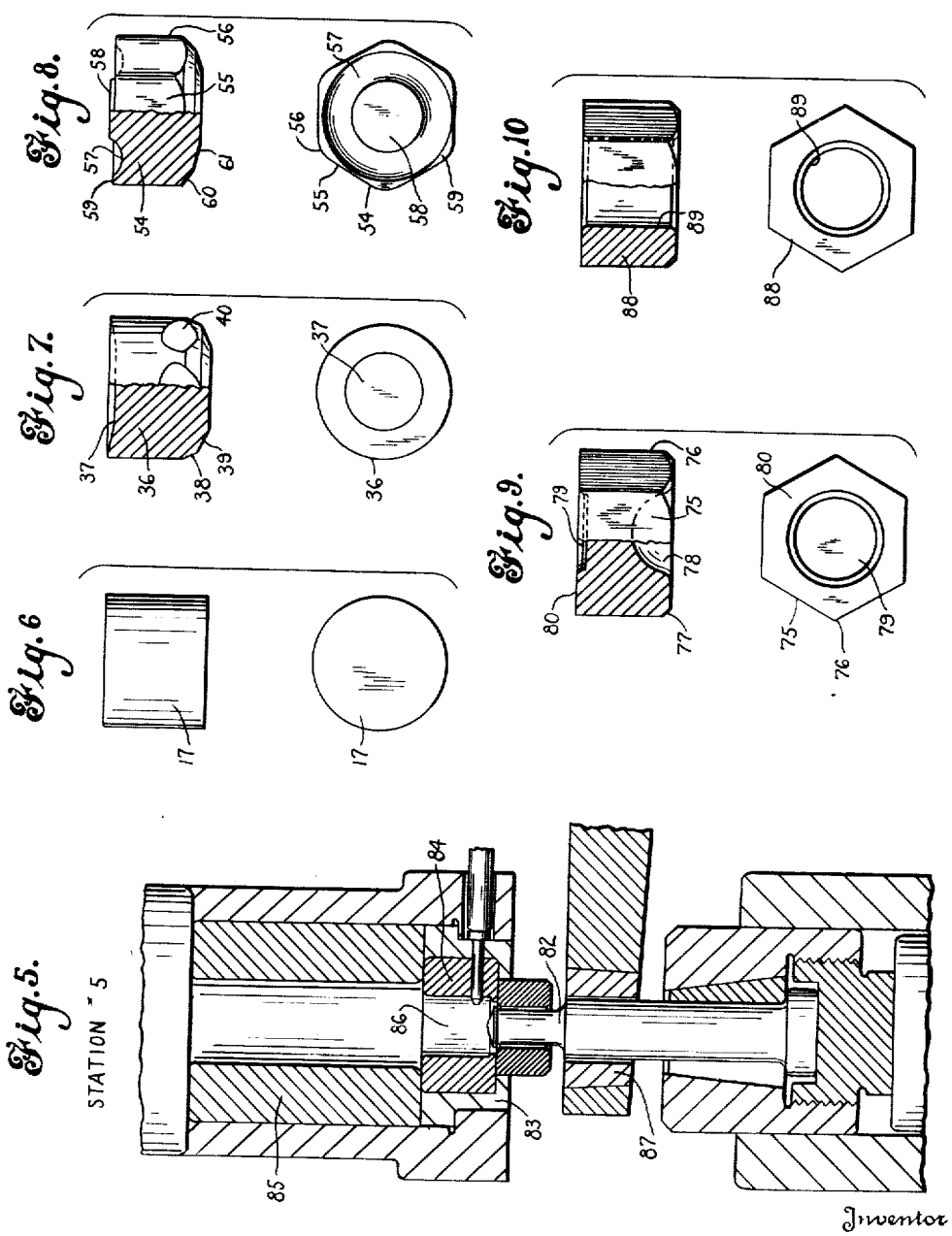

2,572,793

UNITED STATES PATENT OFFICE 2,572,793

METHOD OF MAKING PLAIN FACE NUTS OR THE LIKE

Richard L. Wilcox, Waterbury, Conn., assignor to The Waterbury Farrel Foundry and Machine Company, Waterbury, Conn., a corporation of Connecticut Application July 31, 1947, Serial No. 765,233

10 Claims. (Cl. 10—86)

This invention relates to a method of and machine for making nuts and similar articles, and more particularly a polygonal nut having a plain or flat face upon one surface and a chamfered face upon the opposite surface.

As shown in the drawings, the method comprises a series of steps consisting of pressing operations at a plurality of stations in the same machine, a workpiece being cut from a suitable length of solid bar stock and then formed, while cold, into the finished blank. The operations are carried out upon a machine having a plurality of stations at which the several steps of the process are performed, the workpiece being transferred from one station to another, and the machine serving to perform the several operations upon different workpieces or blanks at the same time.

It is contemplated by the present method to employ bar stock of relatively large diameter compared to the width of the finished blank, so as to reduce the lateral flow of metal which is required during the processing operations. Also, while the finished nut blank is provided with a through opening to receive internal threads, only a relatively small amount of metal is wasted as, during the forming operations, the nut is heavily indented, leaving only a small web of metal to be punched out by the piercing punch in order to perfect the opening, and the metal resulting from the indentations being displaced laterally to increase the cross sectional size of the blank.

Moreover, the operation of the present apparatus and the practice of the present process results in a finished nut blank having a flat face upon one surface, and the nut being of polygonal shape. The corners of the blank are well filled out and sharply defined under the pressure of the tools, the flow of metal being controlled so that this result will be effected.

One object of the present invention is to provide a novel method of forming a nut blank from solid stock having a plain flat surface thereon.

A further object of the invention is to provide a novel method and apparatus for forming a polygonal nut blank from solid bar stock, the blank having a plain flat face upon one surface thereof, and being formed by a minimum of operations while the workpiece is cold, and requiring a comparatively small amount of lateral flow of the metal.

A still further object of the invention is to provide a novel method of forming a nut blank having a plain face upon one surface thereof in a series of steps performed at successive stations in a single machine, such that the operations at certain of the stations will be begun or partially performed at preceding stations, thus reducing the work required at succeeding stations.

Still another object of the invention is to provide a machine for forming nut blanks, the machine having a plurality of stations at which successive operations are performed on the work while cold, the work being transferred successively from one station to another, and the operations being of such a character as to form the finished blank with a minimum of effort and with a relatively small number of operations.

To these and other ends the invention consists in the novel features and combinations of parts to be hereinafter described and claimed.

In the accompanying drawings:

Fig. 1 is a sectional view of the working portion of a nut former or press embodying my invention and designed to carry out my improved process;

Fig. 2 is an enlarged sectional view of the tools employed at station #2 of the machine;

Fig. 3 is a similar view of the tools employed at station #3;

Fig. 4 is an enlarged sectional view of the tools employed at station #4;

Fig. 5 is an enlarged sectional view of the tools employed at station #5 of the machine;

Fig. 6 illustrates in side elevational and top plan view the workpiece employed to make the blank;

Fig. 7 shows similar views of the workpiece after the operation performed at station #2;

Fig. 8 shows similar views of the workpiece after being subjected to the operations performed by the tools at station #3; and Figs. 9 and 10 illustrate similar views of the workpiece after being subjected to the operations performed by the tools at stations #4 and #5.

To illustrate my method and one embodiment of the machine for carrying out the method, I have shown a die block 10 held at one end of a header frame 11 by suitable securing means, such as wedges 12 and a movable gate 13 designed to be reciprocated toward and from the die block in the usual manner, and carrying a plurality of tools to cooperate with a plurality of separate dies mounted in the die block, as will be hereinafter explained.

At station #1 is mounted a cut-off die 14 having an opening through which is fed a length of stock 15, so that a portion thereof will protrude from the die to be severed by the cut-off knife 16, which is shown diagrammatically, as this is well known and has been previously practiced in the art. After a short length of workpiece 17 (Fig. 6) is cut from the length of stock, this blank is transferred to the second station of the machine by the knife 16 in the usual manner.

At station #2 a die holder 18 is mounted in the die block, the die holder having an opening therein in which is movably guided a die 19 having a shoulder 20 cooperating with an oppositely facing shoulder 21 of the die holder 18 to limit movement of the die in one direction. The die 19 is urged forwardly by a relatively strong compression spring 22, so that the shoulder 20 will normally stand against the shoulder 21 and the face of the die be flush with the forward face of the die holder. Also movably mounted in the die holder is a knock-out pin 23 disposed within an opening in the die insert 19ª and designed to substantially fill this opening. The knockout pin is actuated by a knock-out rod 24 which may be advanced by suitable mechanism (not shown) against a filler plug 25, which in turn engages the knockout pin 23. It will be noted that the end of the pin 23 is slightly tapered, as shown at 26, so that, as will be hereinafter explained, it will indent or cup the rear face of the workpiece.

The gate at this station is provided with a punch 27 within which is mounted a die holder 28 carrying a die 29, the latter being provided with an opening 30 which cooperates with the opening in the die insert 19ª to form the workpiece at this station. It may here be noted that the lower portion of the die opening 30 is tapered inwardly to a slight extent, as shown at 31, and is provided with flattened areas which extend above this taper, which flattened areas form flat spots upon the workpiece preparatory to forming the polygonal faces.

The die 29 is also provided with a through opening in which is mounted a pin 33 urged forwardly by the spring 34, and the forward movement being limited by contact of the shoulder 35 with the rear end of the die holder 28.

The gate of the machine is shown in its forward or advanced position in Fig. 1. When withdrawn from this position, the pin 33 will project from the gate, and a workpiece 17 cut from the length of stock will be advanced by the knife 16 to a point in registration with the opening in the die insert 19ª. The gate will then be advanced, and the end of the pin 33 will engage the workpiece and force it out of the cutter 16 into the opening in the die insert, permitting the knife to withdraw. As the gate is advanced, the pin 33 will be tracted relatively to the die 29 after the workpiece has been seated in the opening in the die insert 19ª, and the outer face of the die 29 will come into contact with the outer face of the die insert 19ª, thus enclosing the work within the complemental openings of the dies, at which time the pin 33 will close the rear end of the opening in the die 29. Upon a still further advance of the gate, the punch and die 19 will move together, the latter moving against the tension of the spring 22 until the metal of the workpiece has been caused to flow and completely fill the cavity formed by the complemental openings of the two dies between the pins 23 and 33. At the beginning of the forming operation, the workpiece will be completely enclosed in the die cavities, and the greater part of the forming operation will take place during the time that the punch and die 19 are moving rearwardly together against the tension of the die spring.

As the blank emerges from station #2, it is shaped in the form shown at 36 in Fig. 7, the rear portion being substantially cylindrical in shape and having a recess or cup 37 formed in the rear face surrounded by a relatively thin peripheral edge. The forward portion of the blank is tapered, as shown at 38 and 39, and provided with flat spots 40 which are partly upon the tapered portion and partly upon the cylindrical portion.

This workpiece 36 will then be carried to station #3 by any suitable transfer mechanism (not shown). At this station, a fixed die 41 is mounted in a die holder 42, the die being provided with an opening within which moves a knock-out pin 43, this pin being adapted to be retracted by a spring 44. Within the die 41 is a die insert 45 slightly smaller than the outer portion of the opening in the die, and the pin 43 also extends through this insert. As shown in Fig. 3 of the drawings, the insert 45 is provided with a forwardly projecting annular domed or rounded rib 46 which acts upon the rear face of the workpiece and forms therein an annular groove or recess which lies between the outer periphery of the blank and a flat central area, as will be more fully described hereinafter. It may also be noted that the opening in the die 41 is of generally polygonal shape with somewhat rounded corners, so as to effect a preliminary shaping of the blank into polygonal form.

At this station, a punch 47 is secured to the gate in a punch holder 48, and movably associated with the punch is a pin 49 urged outwardly by the spring 50. The punch is provided in its forward face with an opening complemental to the opening in the die 41. This opening comprises angular or frusto-conical portions 51 and 52, which give the front face of the workpiece a generally domed shape, the lateral wall of the domed portion being angular, however, rather than rounded. The end of the pin 49 is substantially flat, so that the extreme forward face of the nut below the domed or angled portions 51 and 52 will be substantially flat.

The workpiece after it has been acted upon by the tools at station #3 is shown at 54 in Fig. 8 of the drawings. It will be apparent that, when the work piece will be provided with an annular with generally flattened sides 55 having unfinished or rounded corners 56. The rear face of the work-piece will be provided with an annular groove or recess 57, this recess surrounding a flattened central portion 58 and lying within a relatively narrow flat peripheral portion 59, this portion being more pronounced at the rounded corners of the blank where flat spots are formed. It has been found that forming the annular recess or groove in the face of the blank, which is to be the flat face in the finished blank, controls the flow of metal, so that at succeeding stations in the machine the corners of the polygonal blank will be well filled out and sharply defined.

The lower portion of the nut is provided with two substantially annular surfaces 60 and 61, these surfaces being formed by the portions 51 and 52 of the opening in the punch, so that the blank is of tapering shape below the flattened lateral surfaces 55.

The blank 54 is then transferred to station #4 on the machine where the formation of the workpiece will be completed except for the piercing operation. At this station, a floating die 63 is movably mounted in a die holder 64, the die being urged outwardly by a strong spring 65. Within an opening in the die 63 are mounted die inserts 66 and 67. The die insert 66 is provided with a polygonal opening 68 having sharply defined corners to properly form the finished nut.

A punch 69 operates through an opening in the insert 67, this punch being provided with a reduced or domed end 70 to indent the outer surface of the workpiece, but the contact of the workpiece or blank with the forward face of the die insert 67 will, at this station, form a flat plain upper surface about the indentation formed by the end 70 of the punch.

The gate at this station is provided with a fixed punch 71 held in the punch holder 72. This punch is provided with polygonal faces 73 and a reduced end 74 which forms a relatively deep recess in the forward face of the workpiece. It will be noted that the working end of the punch 71 is slightly smaller than the opening 68 of the die insert 66 so as to leave a small area of the workpiece which is not contacted by the face of the punch, thus forming a chamfered edge on the front face of the blank.

When the blank has been carried to a position in alignment with the tools at station #4 by the usual transfer mechanism, the gate advances and the punch 71 pushes the blank out of the transfer mechanism into the opening 68 of the die insert 66. Continued advance of the punch causes the blank to be compressed between the punches 69 and 71, and between the latter and the forward face of the die insert 67 the metal of the blank will be caused to flow against the polygonal sides of the die opening and fill the sharp corners between these dies. Also, the die 63 will be forced slightly rearwardly against the spring 65, so that the rear end of the workpiece will be caused to take up against the end of the punch 69, thus forming an indentation in the rear face of the blank at the same time that the remainder of the rear face is shaped into a flat plane surface. The ends of the punches are so shaped that both indentations are countersunk, thus providing for a countersunk-through opening in the blanks, so that no projecting burr will be thrown out in the threading operation.

At this time, the blank is in the form shown in Fig. 9 of the drawings where, it will be seen that, it is provided with flat faces 75 having sharply defined corners 76 therebetween. The forward face of the blank will be chamfered, as shown at 77, and will be provided with a relatively deep recess or indentation 78. The rear face of the blank will be provided with a central indentation 79 and a flat face 80 surrounding this indentation.

The blank is then transferred to station #5 where the piercing operation is performed. At this station, the gate is provided with a piercing punch 82 which cooperates with a retainer die 83 and an anvil die 84, these two dies being seated upon a fixed bushing 85. As will be apparent from Fig. 5 of the drawings, the front face of the anvil die is flat so as to contact the flat face of the nut blank, and this die is provided with an opening 86 to receive the slug punched from the center of the blank. It will also be noted that the retainer die surrounds only the rear portion of the blank to prevent this portion from expanding during the piercing operation. By this arrangement, the retainer die may be made solid instead of sectional, and, while the blank will be effectively prevented from swelling or enlarging, it may be readily withdrawn from the die upon return of the punch and stripped by the usual stripper 87.

The blank, after it has been operated upon by the tools at station #5, is shown at 88 in Fig. 10 of the drawings, where, as will be apparent, it is provided with a smooth clean opening 89 for receiving a suitable thread to complete the manufacture of the nut. Except for the punching of the hole, the configuration of the nut as it was formed at station #4 is retained by the tools at station #5.

While I have shown and described a preferred embodiment of my invention, it will be understood that it is not to be limited to all of the details shown, but is capable of modification and variation within the spirit of the invention and within the scope of the claims.

What I claim is:

1. The method of making a nut blank having a flat face at one end thereof surrounding the opening through the blank, which comprises cutting the workpiece from a length of solid stock, forming a cup-shaped area in the face at one end of the workpiece, and then placing the blank in a die having flattened side walls and applying pressure to the blank to form at said face a central substantially circular flat area and an annular recess surrounding and extending inwardly beyond said area to force the metal of the blank laterally.

2. The method of making a nut blank having a flat face at one end thereof surrounding the opening through the blank, which comprises cutting the workpiece from a length of solid stock, forming a cup-shaper area in the face at one end of the workpiece, then applying pressure to the blank to form an annular recess in the cupped face adjacent the outer portion of said face, and indenting both end faces of the blank while forming flat surfaces on its side wall.

3. The method of making a nut blank having a flat face at one end thereof surrounding the opening through the blank, which comprises cutting the workpiece from a length of solid stock, forming a cup-shaped recess in the face at one end of the workpiece, applying pressure to the blank to form an annular recess in the cupped face, and then upsetting the metal at said face to form a flat surface while forming flat faces on the side wall of the blank with sharp corners between the flat faces.

4. The method of making a nut blank having a flat face at one end thereof surrounding the opening through the blank, which comprises cutting the workpiece from a length of solid stock, forming a cup-shaped recess in the face of the workpiece at said end to form a relatively thin peripheral edge, and then placing the blank in a die provided with flattened side walls and applying pressure to the blank to form an annular recess in said face surrounding, and extending inwardly beyond, a central flattened portion to force the metal of the blank laterally.

5. The method of making a nut blank having a flat face at one end thereof surrounding the opening through the blank, which comprises cutting the workpiece from a length of solid stock, forming a cup-shaped recess in the face of the workpiece at said end to form a relatively thin peripheral edge, then applying pressure to the blank to form an annular recess in said face surrounding a central flattened portion, and then indenting and upsetting the metal at said face to form a flat surface about the identation and form flat faces on the side wall of the blank.

6. The method of making a nut blank having a flat face at one end thereof surrounding the opening through the blank, which comprises cutting the workpiece from a length of solid stock, forming an annular recess in one face of the blank surrounding a central flat area, and then centrally indenting this face of the blank while forcing the portion of the face of the blank outside of the indentation against flat anvil surface to upset the metal adjacent said face and forming a flat surface about said indentation.

7. The method of making a nut blank having a flat face at one end thereof surrounding the opening through the blank, which comprises cutting the workpiece from a length of solid stock, forming a cup shaped recess in the face of the workpiece at said end to form a relatively thin peripheral edge about the cupped area, and pressing the blank in a die against a flat anvil surface surrounding an indenting tool to form a flat surface at the cupped face around a central indentation and to form flat sides upon the side wall thereof.

8. The method of making a nut blank having a flat face at one end thereof surrounding the opening through the blank, which comprises cutting the workpiece from a length of solid stock, cupping the face of the workpiece at said end to form a relatively thin peripheral edge, then applying pressure to the blank to form an annular recess in said face surrounding a central flattened portion, and indenting both faces of the blank centrally to form a flat surface about the indentation on one face of the blank while simultaneously forming flat faces on the side wall of the blank.

9. The method of making a nut blank having a flat face at one end thereof surrounding the opening through the blank, which comprises cutting the workpiece from a length of solid stock, cupping the face of the workpiece at said end to form a relatively thin peripheral edge, then applying pressure to the blank to form an annular recess in said face surrounding a central flattened portion, indenting both faces of the blank centrally to form a flat surface about the indentation on one face of the blank while simultaneously forming flat faces on the side wall of the blank, and then punching out the metal between the indentations to perfect an opening through the blank.

10. The method of making a nut blank having a flat face at one end thereof surrounding the opening through the blank, which comprises cutting the workpiece from a length of solid stock, applying pressure to the blank to form an annular recess in said face lying between a central area and the peripheral edge of the blank while forming flattened areas on its side wall, and then indenting said central area to cause the metal to flow outwardly and perfect the flat surfaces on the side wall of the blank and a flat area on said face surrounding the indentation therein.

RICHARD L. WILCOX.

REFERENCES CITED

The following references are of record in the file of this patent:

UNITED STATES PATENTS

| Number | Name | Date |
| --- | --- | --- |
| 1,007,944 | Hansen | Nov. 7, 1911 |
| 1,674,310 | Topping | June 19, 1928 |
| 1,714,316 | Oakley | May 21, 1929 |
| 1,925,753 | Fitch | Sept. 5, 1933 |
| 1,993,137 | Gibney | Mar. 5, 1935 |
| 2,013,460 | Erdman | Sept. 3, 1935 |
| 2,057,527 | Johnson | Oct. 13, 1936 |
| 2,170,473 | Fitch | Aug. 22, 1939 |
| 2,287,214 | Wilcox | June 23, 1942 |
| 2,436,342 | Wilcox | Feb. 17, 1948 |

Certificate of Correction

Patent No. 2,572,793

October 23, 1951

RICHARD L. WILCOX

It is hereby certified that error appears in the printed specification of the above numbered patent requiring correction as follows:

Column 3, line 55, for "tracted" read *retracted*; column 4, line 47, for "will be provided with an annular" read *leaves station #3, it will be formed*; column 6, line 32, for "cup-shaper" read *cup-shaped*;

and that the said Letters Patent should be read as corrected above, so that the same may conform to the record of the case in the Patent Office.

Signed and sealed this 5th day of February, A. D. 1952.

[SEAL]

THOMAS F. MURPHY,
*Assistant Commissioner of Patents.*